US007055746B2

(12) United States Patent
MacKay et al.

(10) Patent No.: US 7,055,746 B2

(45) Date of Patent: Jun. 6, 2006

(54) POSTAGE INDICIA INCLUDING COLOR BAR SEQUENCE TO AID IN AUTHENTICATION

(75) Inventors: Donald G. MacKay, Roxbury, CT (US); Claude Zeller, Monroe, CT (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 20 days.

(21) Appl. No.: 10/819,700

(22) Filed: Apr. 7, 2004

(65) Prior Publication Data

US 2005/0224580 A1 Oct. 13, 2005

(51) Int. Cl.
*G06K 7/10* (2006.01)

(52) U.S. Cl. ............................ 235/462.04; 235/472.01

(58) Field of Classification Search .............................. 235/462.01–462.45, 472.01, 472.02, 472.03, 235/454, 455, 468, 375, 383; 382/199

See application file for complete search history.

(56) References Cited

U.S. PATENT DOCUMENTS

| | | | | |
|---|---|---|---|---|
| 5,525,798 | A * | 6/1996 | Berson et al. | 250/271 |
| 6,039,257 | A * | 3/2000 | Berson et al. | 235/468 |
| 6,070,805 | A | 6/2000 | Kaufman et al. | |
| 6,256,638 | B1 | 7/2001 | Dougherty et al. | |
| 6,655,579 | B1 * | 12/2003 | Delman et al. | 235/375 |
| 6,895,116 | B1 * | 5/2005 | Yen et al. | 382/199 |
| 2005/0071295 | A1 * | 3/2005 | Cordery et al. | 705/405 |

* cited by examiner

*Primary Examiner*—Thien M. Le

(74) *Attorney, Agent, or Firm*—Ronald Reichman; Angelo N. Chaclas

(57) ABSTRACT

The present invention includes apparatus and methods for printing and verifying postage stamps on demand via a personal postage stamp printer. The indicia by which the stamp is printed includes a color bar sequence and a data field including data that corresponds to the color bar sequence. To authenticate the stamp, the data field is read and the color bar sequence data included in the data field is compared with the data generated by detecting the color bar sequence itself.

30 Claims, 7 Drawing Sheets

POSTAGE INDICIA INCLUDING COLOR BAR SEQUENCE TO AID IN AUTHENTICATION

CROSS-REFERENCE TO RELATED APPLICATION

This application is related to prior co-pending application Ser. No. 10/645,376 filed Aug. 21, 2003, which is incorporated herein by reference in its entirety.

BACKGROUND

This invention relates generally to the field of postal revenue protection, and, more particularly, to printing and reading of machine-verifiable postage indicia.

It has been proposed to provide postage stamp printing devices that may be used by postal patrons to print their own postage stamps. However, it is an important consideration that counterfeiting of such postage stamps be deterred. Accordingly, apparatus and methods for printing and inspecting machine-verifiable postage stamps are provided.

SUMMARY

In one aspect, a method includes providing encoded data that is indicative of a color bar sequence, and printing a postage indicium that includes the color bar sequence. The postage indicia also includes a data field, such as a two-dimensional barcode, that comprises the encoded data indicative of the color bar sequence.

The data field may be printed in monochrome, and the color bar sequence may include respective bars of different colors. The postage indicia may be printed on an adhesive label to form a postage stamp. The color bar sequence may be selected from among a plurality of color bar sequences for which corresponding data is stored in a read only memory (ROM). The encoded data that is indicative of the color bar sequence may be received from a server computer by the device which prints the postage indicia, in response to the printing device uploading to the server computer selection data that indicates selection of the color bar sequence.

In another aspect, an apparatus includes a print head that has a first set of print elements for printing a color bar sequence and a second set of print elements for printing at least one other feature of a postage stamp indicium. The apparatus further includes a print head controller for controlling the print head, and a ROM for storing data that corresponds to a color bar sequence. The apparatus also includes a memory for storing a first driver to control the print head controller to drive the first set of print elements to print a selected color bar sequence for which data is stored in the ROM. The memory also stores a second driver to control the print head controller to drive the second set of print elements. Also included in the apparatus is a mechanism for receiving, from a server computer, image data that represents a two-dimensional barcode. The two-dimensional barcode contains data indicative of the printed color bar sequence. The second driver controls the print controller to drive the second set of print elements to print the two-dimensional barcode represented by the image data received from the server computer.

The second set of print elements may print the two-dimensional barcode adjacent to the selected color bar sequence that is printed by the first set of print elements. The second set of print elements may also print a pictorial image adjacent to the selected color bar sequence that is printed by the first set of print elements. The print head may be a thermal print head. The selected color bar sequence printed by the first set of print elements may include bars of mutually different colors (in addition to other bars of various colors), and the second set of print elements may print the two-dimensional barcode in monochrome.

In still another aspect, a method includes detecting colors of bars in a color bar sequence that is a first portion of a postage indicium, thereby generating first color bar sequence data. The method according to this aspect also includes reading data from a second portion of the postage indicia. The second portion is different from the first portion, and the reading of data from the second portion generates second color bar sequence data. The method according to this aspect further includes comparing the second color bar sequence data with the first color bar sequence data.

The second portion of the postage indicia may be a two-dimensional barcode. The method in this aspect may include detecting a spectral characteristic of the postage indicia and/or scanning the first and second portions of the postage indicia prior to detecting the colors of the color bar sequence and prior to reading data from the second portion of the postage indicia. The reading of data from the second portion of the postage indicia may include decrypting the second color bar sequence data.

In still a further aspect, a server computer includes a mechanism for receiving color bar sequence information from a postage indicia printer, and a mechanism for generating two-dimensional barcode image data that corresponds to the received color bar sequence information. The server computer also includes a mechanism for transmitting the two-dimensional barcode image data to the postage indicia printer.

The mechanism for generating the two-dimensional barcode image data may include a mechanism for encrypting the received color bar sequence information.

In yet another aspect, a postage indicium includes a color bar sequence and a two-dimensional barcode. The two-dimensional barcode may represent encoded data indicative of the color bar sequence. The color bar sequence may include (along with other bars) three bars having mutually different colors. The postage indicia may also include a pictorial image.

In accordance with the invention, postage indicia may be printed on adhesive label stock to form postage stamps. Each indicia may include a color bar sequence, which may vary from indicia to indicia. Each indicia may also include encoded data (e.g., in a two-dimensional barcode) which corresponds to the color bar sequence in the indicia. The authenticity of the indicia may be verified by scanning the indicia and then (e.g., automatically by machine) comparing the color bar sequence with the encoded color bar sequence data to determine whether these two elements of the indicia match. Thus the presence of these elements in a postage indicia may help to deter counterfeiting.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention includes apparatus and methods for allowing a postal customer to print his or her own postage stamps. The stamps are printed using a personal postage stamp printer. The stamp printer prints on adhesive label stock. The postage indicia printed to form the stamp includes a color bar sequence. The postage indicia also includes data that corresponds to the color bar sequence. This data is encoded (and possibly also encrypted) in a two-dimensional (2D) barcode or in another form. The color bar sequence and the 2D barcode vary from stamp to stamp. The 2D barcode is downloaded to the postage stamp printer from an administrative server, which handles charging of the postage to the customer's account.

To verify the stamp, the stamp is scanned and machine analysis is performed to detect the colors of the bars in the color bar sequence and to read the color bar sequence data encoded in the 2D barcode. If these two pieces of information match, the authenticity of the stamp may be considered to be verified.

Figure 1:
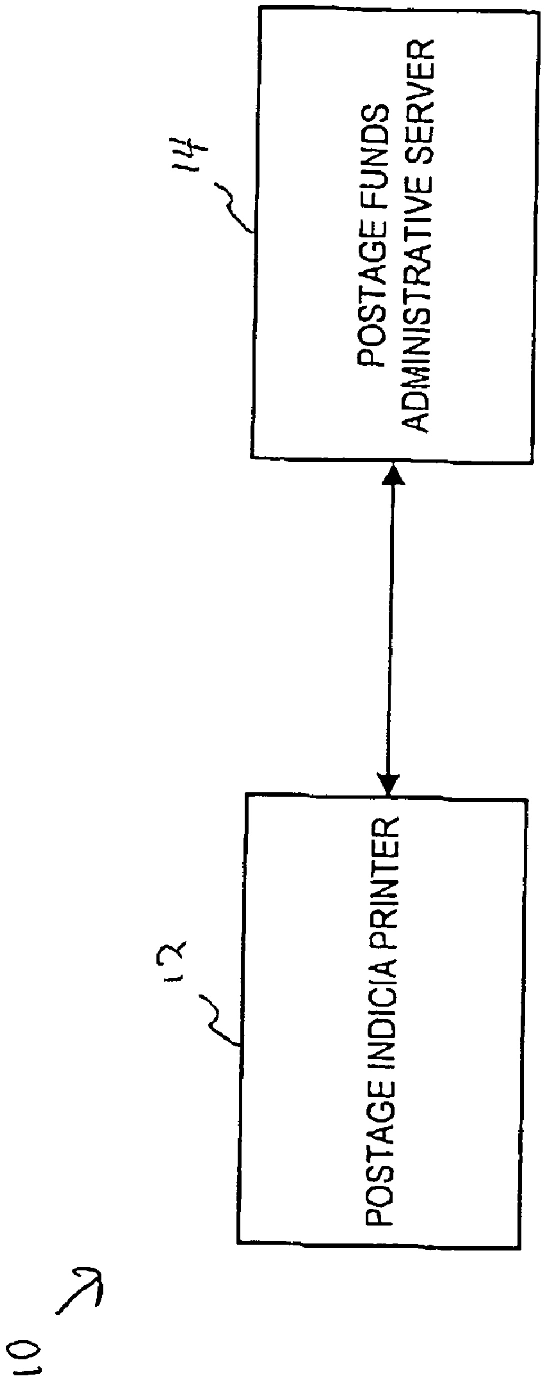
FIG. 1 is a block diagram that illustrates a consumer postage stamp printing apparatus arranged in accordance with principles of the present invention.

Referring now to the drawings, and particularly to FIG. 1, the reference numeral 10 indicates generally a postage stamp printing apparatus in accordance with principles of the present invention. The apparatus 10 includes a personal postage stamp printer 12 shown in data communication with a postage funds administrative server 14.

Both the printer 12 and the server 14 will be described in more detail below, but their functions will be generally described now. The printer 12 prints postage stamps on demand by the postal customer who has possession of the printer. The printer may operate independently of the server to print a stamp while not connected to the server. The server 14 handles charging the customer's account for postage corresponding to stamps authorized to be printed by the printer 12. The server 14 also generates and downloads to the printer 12 security-related information to be included in the images printed to form the postage stamps.

The printer 12 may be in occasional data communication with the server 14 via, for example, a dial-up connection and/or the Internet.

Figure 2:
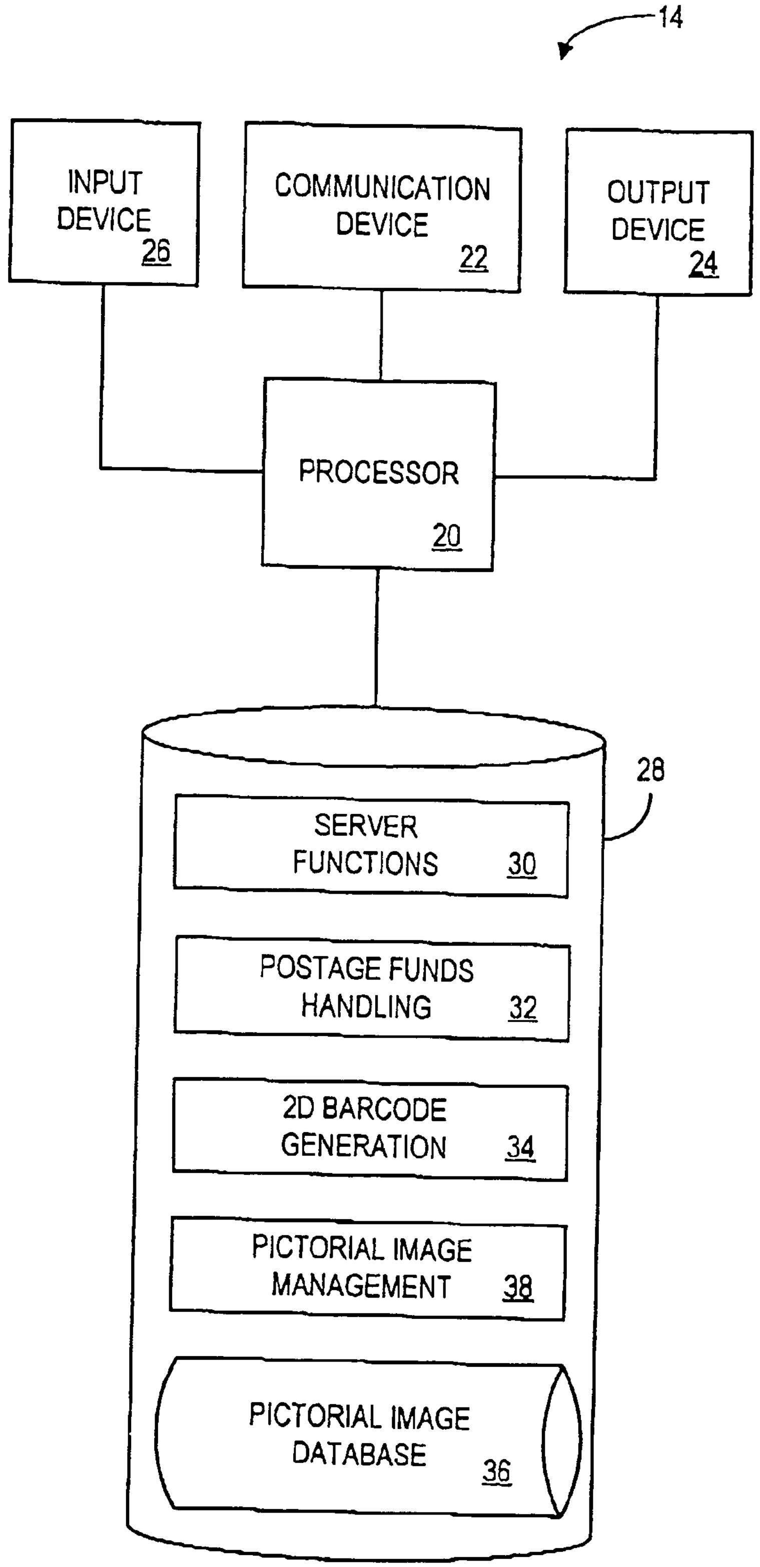
FIG. 2 is a block diagram that illustrates an administrative server that is part of the apparatus of FIG. 1.

FIG. 2 is a block diagram that illustrates an embodiment of the server 14 shown in FIG. 1. Generally, in some embodiments, the server 14, in its hardware aspects, may be constituted by conventional computer hardware. As seen from FIG. 2, the server 14 may include a processing unit 20. The processing unit 20 may be constituted by one or more processors of the type used in server computers, mainframe computers, minicomputers and/or desktop computers. The server 14 may also include a communication device 22 in communication with the processing unit 20. The communication device 22, for example, may comprise one or more data communication ports by which the processing unit 20 may exchange data with the printer 12 (FIG. 1) and/or with other personal postage stamp printers. (Although only one printer is shown in FIG. 1, it should be understood that the server 14, at any one time or at various times, may be in communication with a number, and potentially a large number, of different personal postage stamp printers.)

The server 14 may further include an output device 24 in communication with the processing unit 20 and an input device 26 in communication with the processing unit 20. The output device 24, for example, may comprise one or more printers and/or one or more display monitors. The input device 26 may include conventional devices such as a keyboard and/or mouse or other pointing device. The input device 26 may be used by a human operator to control, administer, maintain or provide input to the server 14.

There may also be included in the server 14 a storage device 28 that is in communication with the processing unit 20. The storage device 28 may comprise, for example, a combination of magnetic, optical and/or semiconductor memory devices. In some embodiments, the storage device 28 may include one or more hard disk drives, RAM (random access memory), ROM, and one or more drives for removable data storage media.

The storage device 28 may store a number of programs for controlling the processing unit 20. For example, the storage device 28 may store server functions software 30 that enables the server 14 to function as a host to client devices such as the above-mentioned personal postage stamp printers that may be in communication with the server 14 from time to time. (In an alternative embodiment, a personal computer may be connected to a personal stamp printer.)

The storage device 28 may also store postage funds handling software 32 that enables the server 14 to handle charges to customer accounts with respect to postage funds disbursed by printing of postage stamps authorized by the server 14.

The storage device 28 may further store software 34 that enables the server 14 to generate image data that corresponds to 2D barcodes to be printed by the personal postage stamp printers as part of the postage indicia that form the stamps.

In addition, the storage device 28 may store a pictorial image database 36 and software 38 for managing the pictorial images in the pictorial image database 36. The pictorial image database 36 may store data that represents a small or large number of different pictorial images. Users of the personal postage stamp printers may be allowed to select one of the images stored in the database 36 for inclusion in the stamps to be printed by the personal postage stamp printers. Users may be permitted to change the image used by the printer from time to time, say, from batch to batch of stamps printed by the printer. The software 38 functions to manage the pictorial images, including selection thereof by the users of the stamp printers and downloading of the images to the stamp printers.

Figure 3:
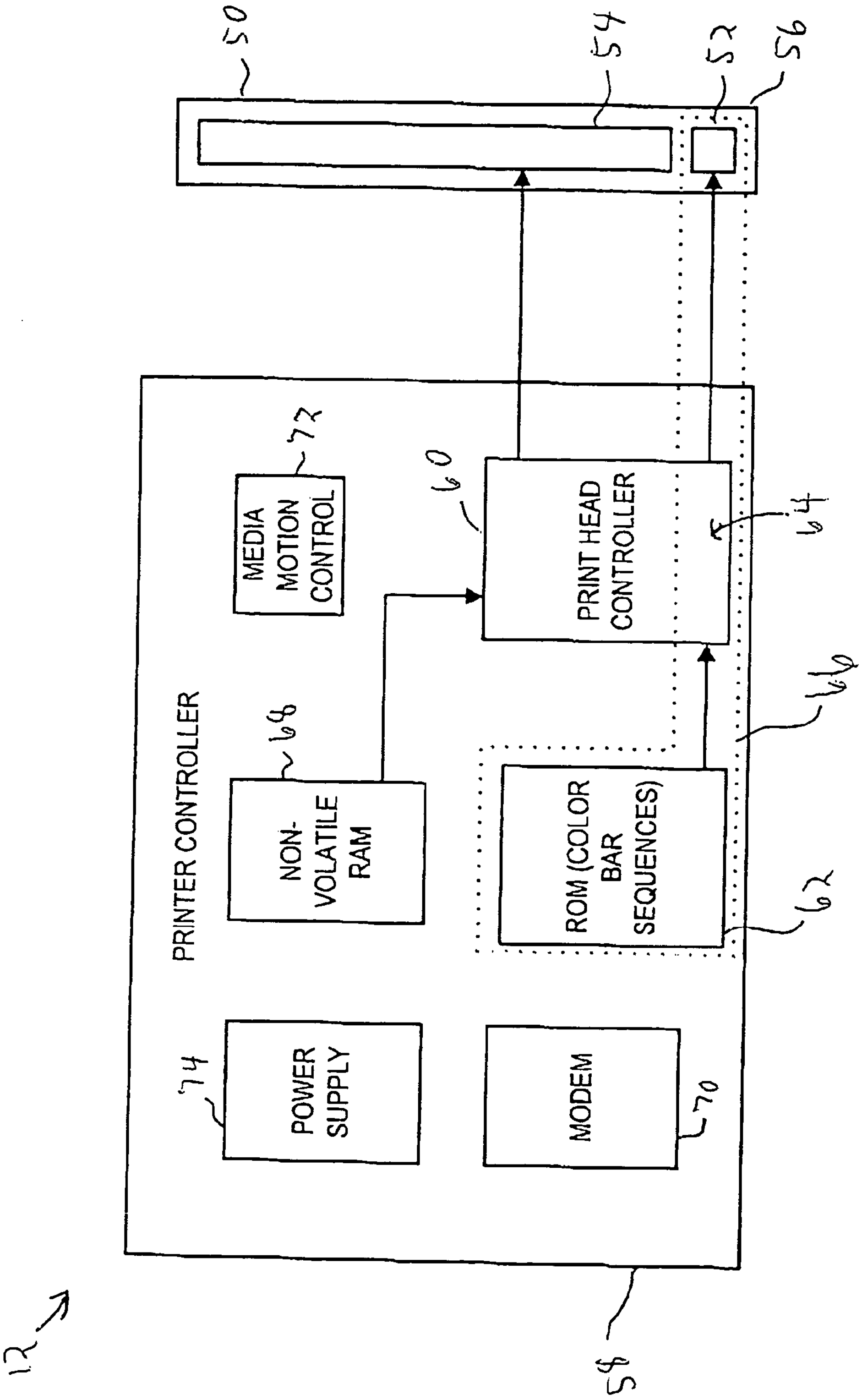
FIG. 3 is a block diagram that illustrates a postage stamp printer that is part of the apparatus of FIG. 1.

FIG. 3 is a block diagram that illustrates an embodiment of the stamp printer 12. The printer 12 includes a print head 50. The print head 50, for example, may be a thermal print head of a type suitable for color thermal printing. The print head 50 may include a first set 52 of print elements and a second set 54 of print elements. The first set 52 of print elements may be dedicated to printing the color bar sequence portion of the postage indicia printed by the printer 12. The second set 54 of print elements may operate to print other portions of the postage indicia. In some embodiments, the first set 52 of print elements may consist of 16 adjoining print elements at a lower end 56 of the print head 50, and the second set 54 of print elements may consist of approximately 280 print elements, being all of the other print elements of the print head 50. In some embodiments, the print head may print at a density of about 300 dpi (dots per inch) to produce indicia having a height of about one inch.

The printer 12 also includes a printer controller 58 that is operatively coupled to the print head 50 to control the print head 50. The printer controller 58 includes a print head controller 60 which is coupled to the print head 50 and which provides the direct control of the print head 50. The print head controller 60 may be constituted by suitable processing or control circuitry and may provide general control functions for the printer 12.

The printer controller 58 may also include a ROM 62 which may store a large number of data sequences at respective address locations in the ROM. Each data sequence may correspond to a respective color bar sequence to be printed on a respective postage stamp to be printed by the printer 12. A portion (indicated at 64) of the print head controller 60 may be dedicated (e.g., hard-wired) to control only the first set 52 of print elements, and to cause the print elements 52 to print only color bar sequences as defined by the data sequences stored in the ROM 62. The ROM 62 may be coupled to the dedicated portion 64 of the print head controller 60. A security perimeter 66 may be provided to prevent and/or deter (and/or to provide evidence of) tampering with the ROM 62, the dedicated portion 64 of the print head controller 60, and the print elements 52 to assure that the print elements 52 print only color bar sequences defined by the data in the ROM 62. Alternatively the printer controller may be capable of calculating a color bar sequence according to an algorithm from a seed value stored in ROM.

The printer controller 58 may further include a non-volatile RAM 68, which may be in communication with the print head controller 60. The RAM 68 may operate as working memory and may also store image data, to be discussed below, which is downloaded to the printer 12 from the server 14 (FIG. 1) and which may be used to control the print head 50 to print one or more postage indicia elements prescribed by the server 14. In some embodiments, RAM 69 may also function as program storage for a program to control the print head controller 60.

In addition, the printer controller 58 may include a modem 70 through which the printer 12 may engage in data communication with the server 14, a media motion control circuit 72 that controls feeding of a substrate (e.g., an item of adhesive label stock, which is not shown in FIG. 3) past the print head 50, and a power supply 74 that provides power for at least part of the printer 12. The printer controller may also have a communication port (USB, serial, parallel, etc.) for communicating with a PC.

The printer 12 may also include other components which are not indicated in FIG. 3. Such other components may include, for example, a housing, a user interface (e.g., one or more switches or buttons, a display, a touch screen, etc.), and mechanical components for transporting the stamp stock past the print head 50.

Figure 4:
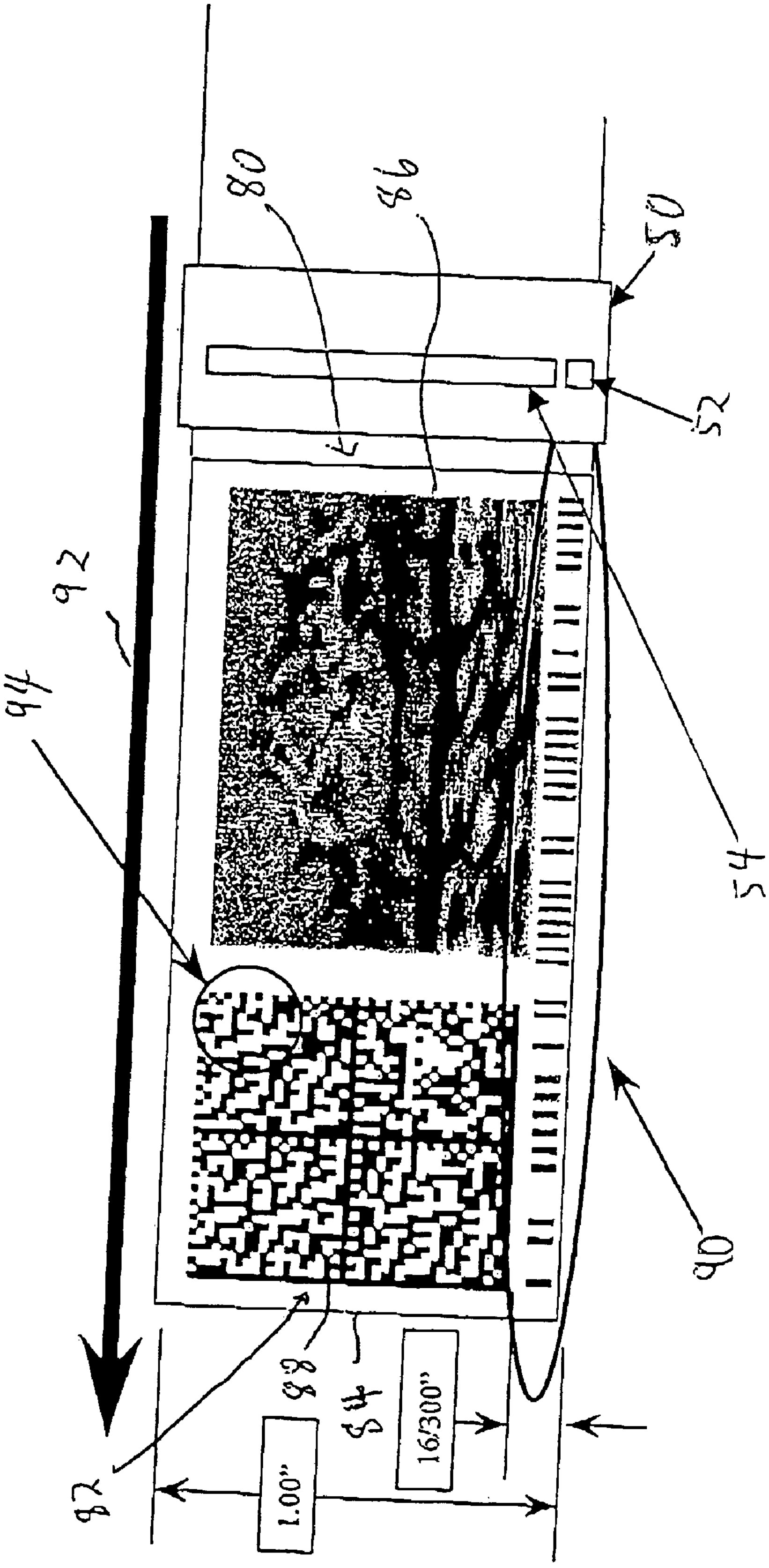
FIG. 4 illustrates a postage stamp printed in accordance with principles of the present invention, shown in juxtaposition with a print head for printing the postage stamp.

FIG. 4 illustrates a postage stamp 80 printed by the printer 12 in accordance with principles of the present invention, and shown in juxtaposition with the print head 50 of the printer 12 (the balance of printer 12 is not shown in FIG. 4). The postage stamp 80 includes a postage indicia 82 formed on a substrate 84 (e.g., adhesive label stock). In some embodiments, the substrate may be a type of stock suitable for thermal color printing.

The postage indicia 82 may include a pictorial image 86 and a data field 88 in which machine-readable data is printed. The data field 88, for example, may take the form of a 2D barcode. Some or all of the data field 88 may be printed in accordance with the "Information-Based Indicia Program" (IBIP) promulgated by the U.S. Postal Service. The IBIP information may contain high-density variable cryptographically protected information in a 2D barcode. The IBIP information may be used for security and marketing purposes. As will be seen, the data field 88 may also include data provided for security purposes (stamp authenticity verification purposes) in accordance with the principles of the present invention.

The postage indicia 82 also includes a color bar sequence 90, printed in accordance with principles of the present invention. The color bar sequence 90 includes a series of bars arranged in a row. All of the bars of the color bar sequence may be printed by the print elements 52 of the print head 50, so that the color bar sequence 90 extends along the bottom of the postage indicia 82, adjacent to the pictorial image 86 and the data field 88. The pictorial image 86 and the data field 88 are printed by the print elements 54 of the print head 50.

In some embodiments, at least some of the bars of the color bar sequence 90 are of different colors selected from a predetermined set of colors. For example, in some embodiments, any bar of the color bar sequence 90 may be any one of the set of colors {red, yellow, green, blue, white} ({R, Y, G, B, W}). Other sets of colors may be employed. The number of bars in the color bar sequence 90, in some embodiments, may be 52 (including in some embodiments "white" bars which are not apparent). With a color bar sequence that includes 52 bars, each of which may be any one of five different colors, the number of possible unique color bar sequences is $5^{52}$, or approximately 2.2* $10^{36}$. In other embodiments, more or fewer than 52 bars may be included and/or more or fewer than five different colors may be available for selection for each bar. The following is an example representation of a color bar sequence, where each character in the representation indicates the color of a respective bar:

RYBBRWRRGGGWRYBBYYRRRGGWYBBY-
WRRGGYWBBBYYRRWWBRGRBWBR

Even if only ten bars are included in the color bar sequence, if five colors are used, the number of possible color bar sequences is $5^{10}$, or about ten million.

The postage indicia 82 is shown in FIG. 4 in juxtaposition with the print head 50. The arrow mark 92 is indicative of the direction in which the substrate 84 is moved past the print head 50 to allow the first set 52 of print elements to print the color bar sequence 90 while the second set of print elements 54 print other portions of the indicia 82 such as the data field 88 and the pictorial image 86.

As will be further discussed below, the data field 88 represents encoded data that is indicative of the color bar sequence 90. That encoded data, for example, may be presented at a predetermined part (indicated at 94) of the data field 88.

It should be understood that the indicia 82 may include other elements, which are not shown, and which may include, for example, numerals, that indicate the denomination (postage value) of the stamp 80. In addition, the indicia 82 may include one or more finder or reference marks, which are not shown, to aid in subsequent scanning and parsing of the indicia 82.

Figure 5:
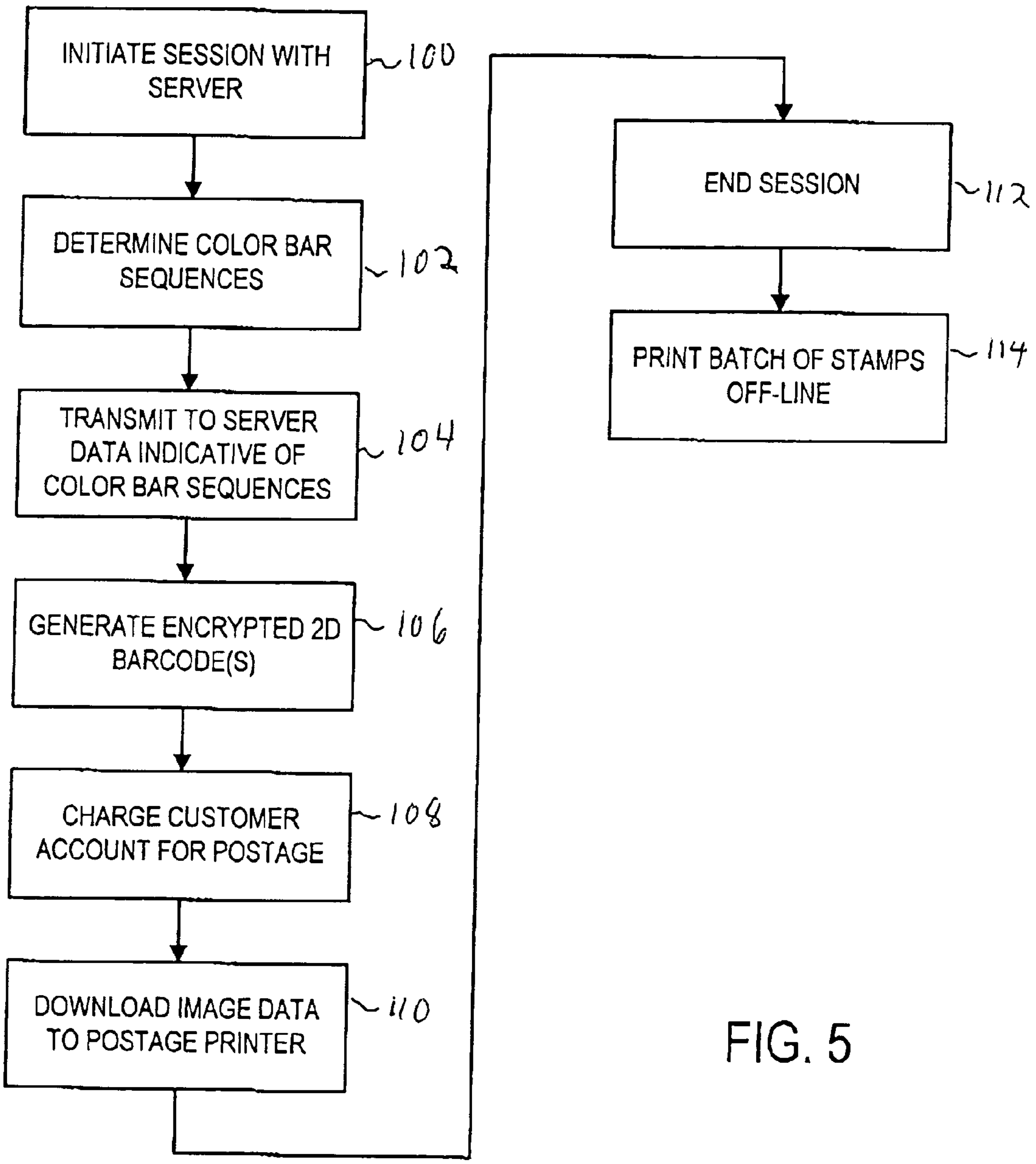
FIG. 5 is a flow chart that illustrates a process that may be performed by the apparatus of FIG. 1.

FIG. 5 is a flow chart that illustrates a process by which one or more postage stamps, like the stamp 80 shown in FIG. 4, may be printed in accordance with principles of the present invention. The process illustrated in FIG. 5 includes process steps performed by the postage indicia printer 12 or by the administrative server 14, or by the printer 12 and the server 14 operating in cooperation with each other. Accordingly, FIG. 5 is illustrative of software processes that control the printer 12 and the server 14 in accordance with principles of the present invention.

Initially in the process of FIG. 5 is step 100, at which the postage indicia printer 12 (FIGS. 1 and 3) initiates a data communication session with the administrative server 14 (FIGS. 1 and 2). This may be done, for example, by the postage indicia printer 12 dialing up the server 14 and engaging in a handshaking procedure with the server 14. The purpose of the communication session is to obtain authorization from the server 14 for the printer 12 to print one or more stamps, and also for the printer 12 to receive from the server 14 data to be used in printing the stamps. (In an alternative embodiment, the printer may receive the data to be used in printing the stamps via a connection to a PC and the Internet.)

Next in the process of FIG. 5 is step 102, which in some embodiments may precede, or may occur simultaneously with, step 100. At step 102, the indicia printer 12 determines a series of color bar sequences to be printed in respective stamps for which authorization is to be received from the server 14. In some embodiments, the printer 12 may determine the number of stamps for which authorization is to be requested. This number of stamps (as well as the denominations of the stamps, e.g.) may be determined based on input from a user of the printer 12. The printer 12 (for example, by operation of the print head controller 60, FIG. 3) may refer to color bar sequences stored in the ROM 62 on the basis of an index value stored in the RAM 68. The index value may point to an address in the ROM 62 at which data indicative of the first of the series of color bar sequences is stored. In other embodiments, the ROM 62 may be omitted, and the printer 12 may generate the data indicative of the color bar sequence by a random process, or by a pseudo-random process that uses the serial number of the printer 12 as an input.

In any event, at step 104 the printer 12 transmits to the server 14 the data indicative of the color bar sequences to be included in the stamps for which authorization is being requested. This may be done, in part, by reading the color bar sequence data from the ROM 62 based on the index value referred to above. After reading out the color bar sequence data and transmitting the data to the server 14, the index value may be updated to point to the next address in the ROM 62 after the locations at which the transmitted color bar data was stored.

At step 106, the server 14 generates image data that represents the data fields 88 of the stamps now being authorized by the server 14 for printing by the printer 12. As part of the process step of generating the data field image data, the server 14 may encrypt the color bar sequence data received from the printer 12 using a secret key held in the server 14 and may then encode the encrypted color bar sequence data to include the encrypted color bar sequence data in the data for the data field. The data field for each stamp to be printed by the printer 12 may include data, encrypted and encoded by the server 12, that represents the color bar sequence 90 (FIG. 4) to be printed as part of the respective stamp. In some embodiments, the color bar sequence data may be encoded for inclusion in the data field without encrypting.

Before, after, or simultaneously with step 106 is a step 108, at which the server 14 initiates a charge to the customer's account for the postage to be represented by the stamps now being authorized for printing. For example, the server 14 may transfer a suitable quantity of funds from a deposit account maintained by the holder of the stamp printer 12 to an account for the benefit of a postal authority such as the U.S. Postal Service. In other embodiments, the server may initiate a charge to a credit card account or another type of account maintained by the holder of the printer 12 at a financial institution.

After step 106, and either before, after or simultaneously with step 108, is step 110, at which the server 14 downloads to the printer 12 the data field image data generated by the server 14 at step 106; that is, the server 14 transmits the data field image data to the printer 12, and the printer 12 (e.g., the modem 70, the print head controller 60 and the RAM 68) receives the data field image data from the server 14. The data field image data for each stamp of the batch of stamps being authorized may be stored in RAM 68 or non-volatile memory.

The downloading of data may also include image data that represents the pictorial image or images 86 to be included in the stamps. The pictorial image or images may have been selected by the user of the printer 12 by, e.g., input entered by the user into the printer 12, or by other arrangement or communication with the server 14. In other embodiments, data representing the pictorial image or images may have been stored in the printer 12 in a previous session with the server 14, for example. In another embodiment, the image data for the pictorial image may have been loaded into the printer 12 at the factory at which the printer 12 was manufactured.

Following step 110 is step 112, at which the data communication session between the server 14 and the printer 12 ends.

Step 114 follows step 112 in the process illustrated in FIG. 5. At step 114, the printer 12 prints the stamps authorized by the server 14 during the session. (In other embodiments, the stamps may be printed during the session. In still other embodiments, the printer prints some stamps during the session with the server or afterward, while storing authorization and data for further stamps in non-volatile memory for later printing.) As part of printing each stamp, the first set 52 of print elements (FIGS. 3 and 4) of the print head 50 print a color bar sequence 90 (FIG. 4) based on color bar sequence data stored in the ROM 62. It will be understood that the color bar sequence data had been communicated to the server 14 during the session, and that the appropriate address in the ROM 62 is indicated by an index value stored in the RAM 68 or non-volatile memory. The printing of the color bar sequence 90 by the first set 52 of print elements may be controlled by first driver software (not separately shown) which may be stored in RAM 68 or ROM 62.

Also as part of the printing of the same stamp, the second set 54 of print elements of the print head 50 print the data field 88 of the stamp, including the color bar sequence data corresponding to the color bar sequence 90, that color bar sequence data having been encoded by the server 14. The second set 54 of print elements 54 also prints the pictorial image 86 and other portions of the indicia 82. The printing performed by the second set 54 of print elements may be controlled by second driver software (not separately shown) which may be stored in RAM 68 or ROM 62. The pictorial image may also encode information about the color bar sequence in the form of a watermark. Other methods of representing the data could also be used.

It will be appreciated that the components and/or the layout of the indicia 82 may be changed. For example, the number of bars in the color bar sequence 90 may be changed, and/or the location of the color bar sequence 90 in the indicia 82 may be changed. The data field 88 may take a form other than a 2D barcode, and the pictorial image 86 may be omitted.

Figure 6:
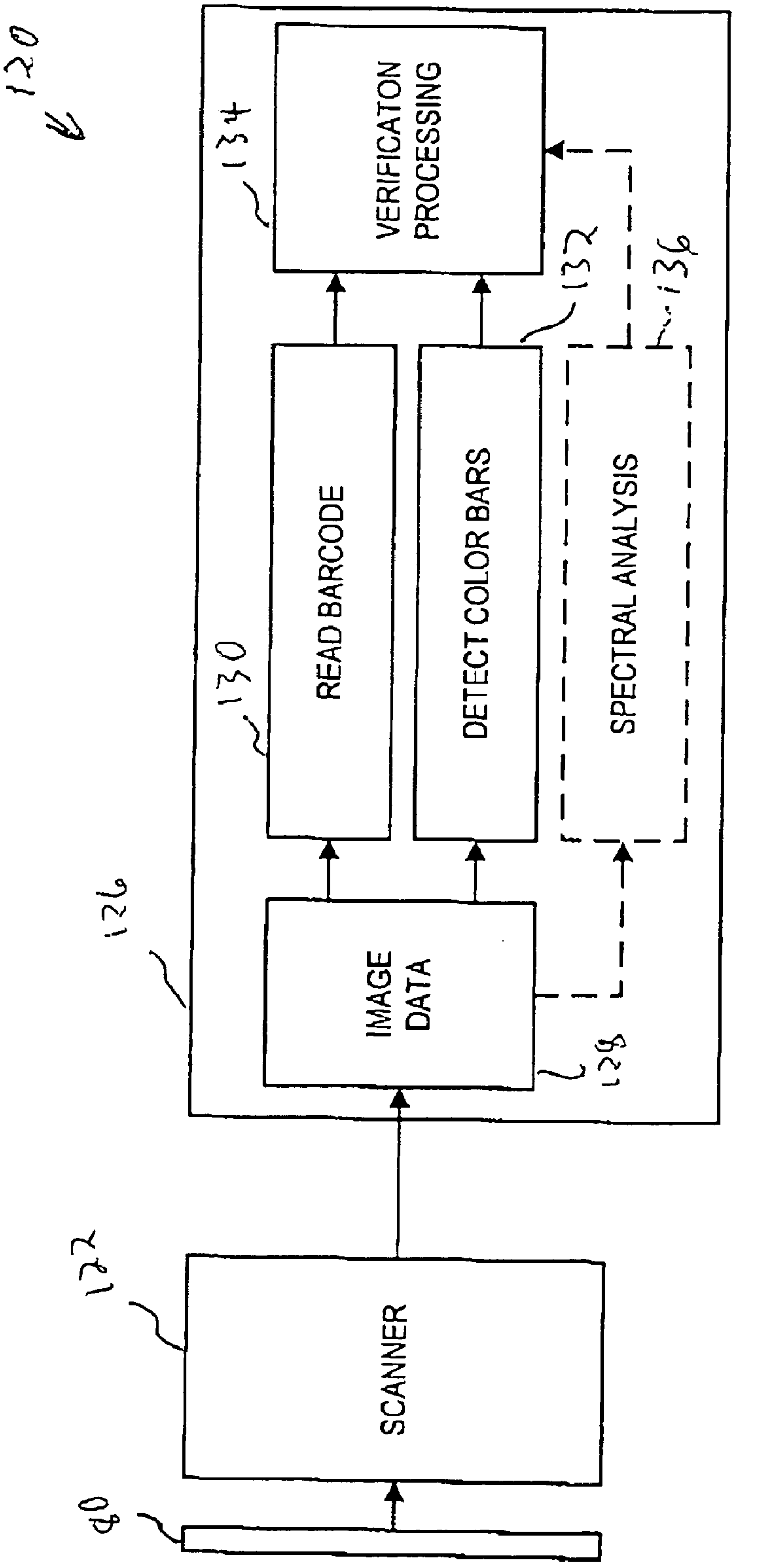
FIG. 6 is a block diagram of a device that may be provided in accordance with principles of the present invention to verify the authenticity of the postage stamp of FIG. 4.

FIG. 6 is a block diagram that illustrates a stamp reading and verification device 120 provided according to principles of the present invention.

The stamp verification device 120 of FIG. 6 includes a scanner 122 that is arranged to scan a postage stamp 80 to capture a color image of the indicia 82 (FIG. 4, not separately shown in FIG. 6) from the postage stamp 80. (At the time of scanning by the verification device 120, the stamp 80 may be affixed to a mail piece, which is not separately shown.) The device 120 also includes an analysis portion 126 which is coupled to the scanner 122 to receive from the scanner 122 image data which is generated by the scanner 122 and represents the image of the indicia. The image data is represented by block 128 in the analysis portion 126. The image data block 128 may comprise, for example, storage and/or preliminary analysis of the image data. The analysis portion 126 includes a data field reading (e.g., 2D barcode reading) block 130 and a color bar detection block 132, both of which operate on the color image data of block 128. The analysis portion 126 further includes a verification processing portion block 134 which receives data, including color bar sequence data ("second color bar sequence data"), read from the data field 88 by the data field reading block 130 and color bar sequence data ("first color bar sequence data") generated by the color bar detection block 132.

In some embodiments, the stamp verification device 120 may also include a spectral analysis block 136 (shown in phantom) to determine at least one spectral characteristic of the stamp 80 on the basis of the image data from the image data block 128, and to provide a result of the spectral analysis to the verification processing portion block 134.

Operation of the stamp verification device 120 will now be described with reference to FIG. 7, which is a flow chart that illustrates an indicia reading and verification process performed by the device 120.

Figure 7:
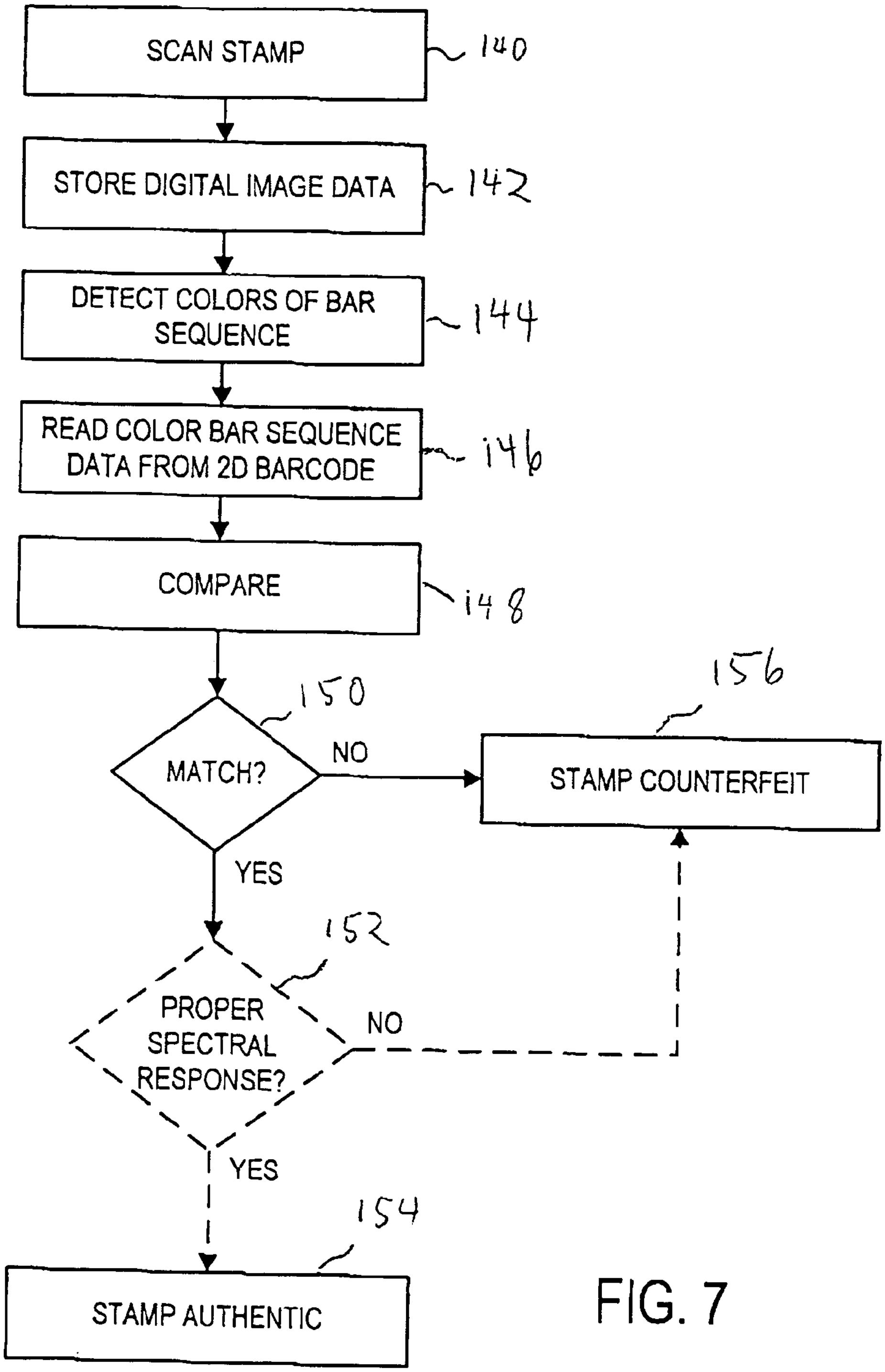
FIG. 7 is a flow chart that illustrates a process that may be performed by the verification device of FIG. 6.

The process of FIG. 7 begins at step 140 at which the scanner 122 scans the stamp 80. Then, at step 142, the resulting digital image data is stored in the image data block 128. At step 144, the color bar detection block 132 detects the colors of the bars in the color bar sequence 90, on the basis of the image data stored in the image data block 128, to generate the first color bar sequence data.

At step 146, the data field reading block 130 reads the data field 88 (as represented in the image data stored in image data block 128) to read the second color bar sequence data from the data field 88. The reading of the second color bar sequence data by the data field reading block 130 may include decrypting the second color bar sequence data. The decrypting may involve using a public key and may verify that the second color bar sequence data encoded in the data field 88 was generated by the administrative server 14 using the secret key referred to in connection with step 106 of FIG. 5.

Continuing to refer to FIG. 7, at step 148, the first and second color bar sequence data are compared by the verification processing portion block 134. A decision block 150 may follow or form part of step 148. At decision block 150, it is determined whether the first and second color bar sequence data match. If so, (and if it is determined at decision block 152, shown in phantom, that the stamp 80 exhibits a proper spectral response for the authorized stock on which stamps are to be printed), the stamp 80 may be considered to be authenticated (step 154). If the first and second color bar sequence data are determined not to match (or if the stamp 80 does not exhibit the proper spectral response), the stamp 80 may be found to be counterfeit (step 156).

With a system as described herein, including printing of a color bar sequence in a postage indicia to form a postage stamp printed on demand by a personal postage stamp printer, along with corresponding color bar sequence data encoded as part of a data field that is separate from the color bar sequence, and reading the color bar sequence and the data field to confirm that the data from the data field matches the color bar sequence, authentication of a postage stamp that is printed on demand can be facilitated and automated, and counterfeiting of such postage stamps can be detected and deterred. Moreover, with the authentication of a postage stamp by comparing the color bar sequence to color bar sequence data in the data field, it may be the case that the stamp verification device does not require access to a central database, thereby significantly reducing the cost and increasing the convenience of the counterfeit-prevention system. With this system, it also may not be necessary to account for blank stamp printing stock.

In some embodiments, the first and second color bar sequence data need not be obtained via a shared scanner or a shared image data store. For example, data field reading and color bar sequence detection may proceed in separate channels.

A stamp authentication device in accordance with some embodiments may read other data in addition to color bar sequence data from the stamp to be authenticated, and may perform other tests in addition to comparing first and second color bar sequence data and detecting a spectral response of the stamp.

In some embodiments, a color bar sequence and a data field which includes corresponding color bar sequence data may be included in an indicium printed directly on a mail piece (by a postage meter, for example) or otherwise used for purposes other than printing a postage stamp on demand from a personal postage stamp printer. Thus, the verification process described herein may be employed to verify postage meter indicia as well as postage stamps printed on adhesive stock, with or without pictorial images as part of the postage indicia.

The order in which process steps are described herein and/or indicated in the drawings is not meant to imply a fixed order of steps, and it is contemplated that the process steps may be performed in any order that is practicable.

In some embodiments, the stamp printer may generate image data for the data field (e.g., 2D barcode) on the basis of encrypted color bar sequence data received from the server.

As an alternative to printing the bars of a color bar sequence in various colors, the bars may be printed as various shades of gray or as various shades of a color other than gray. The term “color bar sequence”, therefore, should be considered to include a sequence of bars of various shades of gray or of various shades of a color other than gray.

In some embodiments, the data field may contain data that represents an identifier for the pictorial image.

The words “comprise”, “comprises”, “comprising”, “include”, “including”, and “includes”, when used in this specification and in the following claims, are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. The present invention may be applied, for example, to verification of indicia other than postage indicia. Other variations relating to implementation of the functions described herein can also be implemented. Accordingly, other embodiments are within the scope of the following claims.

What is claimed is:

1. A method comprising:

providing encoded data indicative of a color bar sequence; and printing a postage indicia which includes:

the color bar sequence wherein the color bar sequence includes respective bars of at least three different colors;

a data field that represents the encoded data indicative of the color bar sequence; and comparing the color bar sequence with the data field to determine that the indicia is authentic if the encoded data in the color bar sequence matches the encoded data in the data field and if the encoded data in the color bar sequence does not match the encoded data in the data field the indicia is counterfeit.

2. The method according to claim 1, wherein the data field includes a two-dimensional barcode.

3. The method according to claim 2, wherein the two-dimensional barcode is printed in monochrome.

4. The method according to claim 1, wherein the data field includes a watermarked image.

5. The method according to claim 1, wherein the printing step includes printing the postage indicia on an adhesive label to form a postage stamp.

6. The method according to claim 1, further comprising:

selecting the color bar sequence from among a plurality of color bar sequences for which corresponding data is stored in a read only memory (ROM).

7. The method according to claim 6, wherein the providing step includes receiving the encoded data from a server computer.

8. The method according to claim 7, wherein the providing step further includes transmitting to the server computer selection data indicative of selection of the color bar sequence.

9. The method according to claim 8, wherein the providing step includes encrypting at least some of the data transmitted to the server computer.

10. The method according to claim 1, wherein the printing step includes thermal printing.

11. An apparatus comprising:

data means for providing encoded data indicative of a color bar sequence; and print means, responsive to the data means, for printing a postage indicia which includes:

the color bar sequence wherein the color bar sequence includes respective bars of at least three different colors;

a data field that represents the encoded data indicative of the color bar sequence; and means for comparing the color bar sequence with the data field to determine that the indicia is authentic when the encoded data in the color bar sequence matches the encoded data in the data field and if the encoded data in the color bar sequence does not match the encoded data in the data field the indicia is counterfeit.

12. The apparatus according to claim 11, further comprising:

a read only memory (ROM) which stores data indicative of a plurality of color bar sequences, the ROM being coupled to the print means.

13. The apparatus according to claim 12, further comprising:

selecting means for selecting one of the plurality of color bar sequences.

14. The apparatus according to claim 11, wherein the data means includes means for receiving the encoded data from a server computer.

15. The apparatus according to claim 11, wherein the data field includes a two-dimensional barcode.

16. The apparatus according to claim 15, wherein the two-dimensional barcode is printed in monochrome.

17. The apparatus according to claim 11, wherein the means for printing includes a thermal print head.

18. A method comprising:

detecting colors of bars in a color bar sequence having three or more colors that is a first portion of a postage indicia, the detecting step generating first color bar sequence data;

reading data from a second portion of the postage indicia, the second portion being different from the first portion, the reading step generating second color bar sequence data; and comparing the second color bar sequence data with the first color bar sequence data, to determine if the indicia is authentic when the encoded data in the color bar sequence matches the encoded data in the data field and if the encoded data in the color bar sequence does not match the encoded data in the data field the indicia is counterfeit.

19. The method according to claim 18, wherein the second portion of the postage indicia is a two-dimensional barcode.

20. The method according to claim 18, further comprising:

detecting a spectral characteristic of the postage indicia.

21. The method according to claim 18, further comprising:

scanning the first and second portions of the postage indicia prior to the detecting and reading steps.

22. The method according to claim 18, wherein the postage indicia is printed on an adhesive stamp.

23. The method according to claim 18, wherein the reading step includes decrypting the second color bar sequence data.

24. An apparatus comprising:

detecting means for detecting colors of bars in a color bar sequence having three or more colors that is a first portion of a postage indicia, the detecting means generating first color bar sequence data on the basis of the detected colors of the bars in the color bar sequence;

reading means for reading second color bar sequence data from a second portion of the postage indicia that is different from the color bar sequence; and processing means, coupled to the reading means and to the detecting means, for comparing the second color bar sequence data with the first color bar sequence data, to determine if the indicia is authentic when the encoded data in the color bar sequence matches the encoded data in the data field and if the encoded data in the color bar sequence does not match the encoded data in the data field the indicia is counterfeit.

25. The apparatus according to claim 24, wherein the second portion of the postage indicia is a two-dimensional barcode and the reading means includes means for reading the two-dimensional barcode.

26. The apparatus according to claim 25, wherein the second color bar sequence data is included in the indicia in encrypted form, and the reading means includes means for decrypting the encrypted second color bar sequence data.

27. The apparatus according to claim 24, further comprising:

means for detecting a spectral characteristic of the postage indicia.

28. A server computer comprising:

means for receiving color bar sequence information having three or more colors from a postage indicia printer;

means for generating two-dimensional barcode image data that corresponds to the received color bar sequence information;

means for transmitting the two-dimensional barcode image data to the postage indicia printer, and means for comparing the color bar sequence information with the bar code data to determine that the indicia is authentic when the color bar code sequence information matches the barcode data and if the color bar code sequence information does not match the bar code data the indicia is counterfeit.

29. The server computer according to claim 28, wherein the means for generating includes means for encrypting the received color bar sequence information.

30. The method according to claim 1, further comprising detecting a spectral characteristic of the postal indicia.

* * * * *